UNITED STATES PATENT OFFICE.

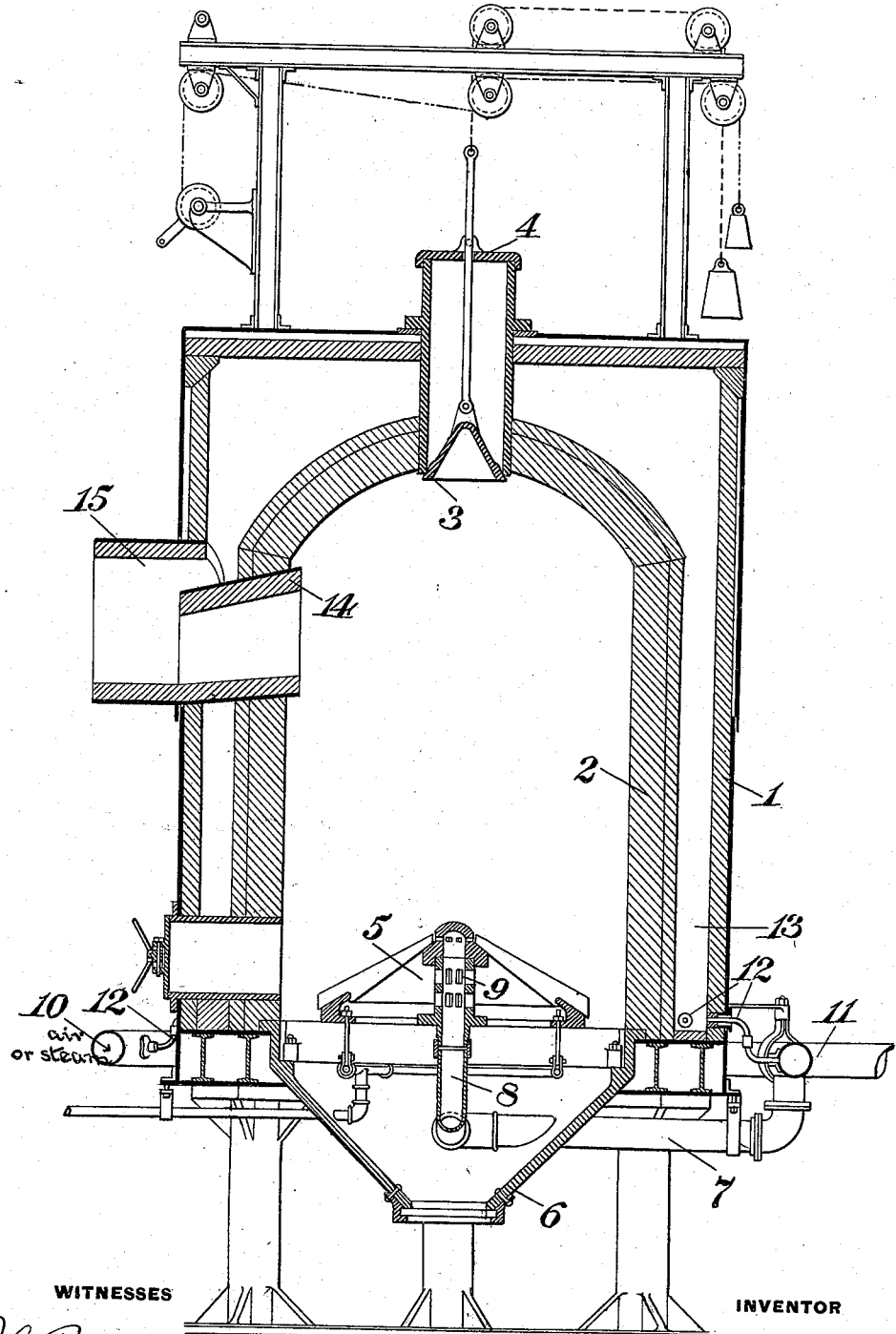

THOMAS CURRY, OF PITTSBURG, PENNSYLVANIA.

GAS-PRODUCER.

No. 858,580.　　　　Specification of Letters Patent.　　　　Patented July 2, 1907.

Application filed September 27, 1904. Serial No. 226,153.

*To all whom it may concern:*

Be it known that I, THOMAS CURRY, a citizen of the United States, residing at Pittsburg, in the State of Pennsylvania, have invented certain new and useful improvements in Gas-Producers, of which the following is a specification.

My invention relates particularly to furnaces designed to convert coal, etc., for the production of gas, providing the heat by means of a small portion of the coal which is constantly burned immediately in the furnace, and has reference especially to means for mixing hot air with the gas to prepare it for burning, and certain improvements in the air supply.

One form of the apparatus is illustrated in the accompanying drawing, wherein the Figure is a vertical section through the middle of the furnace.

Referring to the drawing, 1 is the outside masonry wall, 2 is the inside wall lined with refractory material, 3 and 4 are the doors or covers which provide for the introduction of the coal to the inner furnace, and which may be operated in any approved way, the arrangement shown being old and well known in the art, 5 is the grate beneath which is the usual hopper 6, 7 is the pipe for supplying air or steam to the upright post which is provided at its top with openings 9, 10 is a circumferential pipe extending around the outside of the furnace for supplying air or steam, and fed from the pipe 11, 12 are a plurality of branch pipes spaced about the furnace and leading from the pipe 10 into the air space 13 between the walls 1 and 2, 14 is a circular flue leading from the interior of the heating chamber, and 15 is the mixing flue which leads from the hot air space to the point at which the gas is to be discharged or used. Air is supplied to the space 13 between the two walls of the furnace under pressure from the pipe 10, and by varying the pressure the amount of air thus supplied can be accurately adjusted to give the proper mixture of air and gas in the mixing flue 15. By the use of a number of small pipes 12, the air is supplied equally to all parts of the space 13, thus heating the air uniformly and to the best advantage. Furthermore, the use of a plurality of small pipes obviates the danger of a draft through any one portion of the furnace as is the case where air is admitted to the space 13 through a single large opening.

By my arrangement a thorough heating of the air in the chamber 13 before discharge into the mixing flue 15 is secured. The telescopic arrangement of the flues 14 and 15 is also designed to give a very thorough mixing of the gas and hot air, as the outgoing stream of gas is surrounded on all sides by a current of hot air, thus assuring a complete and uniform mixture. Other advantages incident to the apparatus will be apparent to those skilled in the art.

Having thus described my invention and illustrated its use, what I claim as new and desire to secure by Letters Patent, is

1. In a gas producer the combination of a heating chamber, an auxiliary chamber spaced apart and surrounding the same, a circular pipe surrounding the outer chamber and provided with a plurality of spaced pipes whereby steam or air may be forced into the hot air space, an escape flue for the gases and a combustion flue for the hot air.

2. In combination, a heating chamber, a hot air chamber surrounding the heating chamber, a substantially horizontal escape flue for the hot air chamber, and a tubular escape flue from the heating chamber extending across the hot air chamber in telescopic relation with the first flue and having its outer end open and substantially surrounded by the first flue.

3. The combination with a double walled furnace having a hot air space surrounding the inner wall, of a circular pipe entirely surrounding the furnace and having a plurality of feeding pipes entering the said chamber at spaced intervals about the base of the same, and means for mixing the hot air with a flame just as it emerges from the inner furnace chamber.

4. A gas producing furnace comprising a completely closed inner chamber, a surrounding chamber spaced apart from the inner chamber and having a hot air space practically entirely surrounding the inner chamber, a circular pipe surrounding the lower end of the furnace and feeding air to said hot air chamber and also air to the grate in the furnace, a projecting flue from the inner chamber, and a flue from the outer chamber, the said first flue projecting into the second flue, whereby the flame from the inner chamber is surrounded and fed by hot air from the outer chamber in order to completely burn the gases, substantially as described.

In testimony whereof I have hereunder signed my name in the presence of the two subscribed witnesses.

THOMAS CURRY.

Witnesses:
　CHAS. H. EBERT,
　HERMANN LECHNER.